United States Patent [19]

Destree

[11] 4,368,720
[45] Jan. 18, 1983

[54] METHOD AND APPARATUS FOR CUTTING CONCRETE COLUMNS

[76] Inventor: Allen Destree, 5218 92nd SW., Everett, Wash. 98204

[21] Appl. No.: 273,717

[22] Filed: Jun. 15, 1981

Related U.S. Application Data

[63] Continuation of Ser. No. 82,954, Oct. 9, 1979, abandoned.

[51] Int. Cl.³ .............................................. B28D 1/04
[52] U.S. Cl. .................................... 125/14; 125/23 R
[58] Field of Search .......................... 125/13, 14, 23 R

[56] References Cited

U.S. PATENT DOCUMENTS

| | | | |
|---|---|---|---|
| 3,722,497 | 3/1973 | Hiestand | 125/14 |
| 4,044,749 | 8/1977 | Bowen | 125/23 R |
| 4,124,015 | 11/1978 | Isaksson | 125/23 R |
| 4,144,867 | 3/1979 | Wachs | 125/14 |
| 4,180,047 | 12/1979 | Bertelson | 125/74 |
| 4,233,954 | 11/1980 | Visser | 125/14 |

*Primary Examiner*—Harold D. Whitehead
*Attorney, Agent, or Firm*—David L. Garrison

[57] ABSTRACT

Column cutting method and apparatus wherein an abrasive saw is mounted pivotally on a track encircling a concrete column. Pivotal movement of the abrasive saw sequentially cuts a circumferential kerf around the periphery of the column including reinforcing members by pivoting the saw substantially radially into the column. An uncut center is left for support, which center is easily fractured for removal of superfluous column segment.

10 Claims, 3 Drawing Figures

METHOD AND APPARATUS FOR CUTTING CONCRETE COLUMNS

This is a continuation, of application Ser. No. 082,954, filed Oct. 9, 1979, now abandoned.

BACKGROUND OF THE INVENTION

1. Field of the Invention

This invention relates to a means for cutting concrete columns to provide a smooth finished surface at the cut.

This invention further relates to a method of cutting concrete columns wherein an abrasive saw is utilized on a pivotally mounted saw support carried by track means encircling the column.

2. Description of the Prior Art

Concrete columns are rapidly replacing the wooden column and piling long used to support buildings, wharfs and the like. The availability of suitable timber for such applications and the expense of such timbers has increased the demand for substitute materials. Concrete columns, precast and formed with longitudinal reinforcing elements, such as, reinforcing bar or cables, are ideally suited for support of buildings, wharfs and the like. Concrete is a more nearly permanent material of construction and the columns formed from concrete can be prepared in the precise size, configuration and length to fit the needs of each individual application. One problem with concrete columns is that they are difficult to sever or otherwise manipulate once they are cast and hardened, and placed into their operative positions, such as by pile driving. The columns frequently must be severed or broken off at a particular height in order to meet the requirements of the structure being placed thereon. Heretofore the usual method of severing such concrete columns has been to attack them with a jackhammer to fracture and destroy the concrete surrounding the reinforcing element and then cut the reinforcing elements with an acetylene torch or other metal cutting means. Such an approach usually leaves a jagged and rough surface, not at all desirable for subsequent construction. In addition, it is not at all unusual to have substantial spalling of the concrete below the area at which the cut had been made, thus degrading the structure or frequently requiring remedial measures.

SUMMARY OF THE INVENTION

It is one object of this invention to provide a method of severing concrete beams which results in a smooth cut surface in a plane at a desired angle, usually perpendicular, to the central axis of the column.

It is another object of this invention to provide an abrasive saw holding mechanism which positions the saw in a plane perpendicular to the axis of the column, permits pivotal movement of the saw into the column to cut a circumferential kerf, and provides for movement of the saw to various locations about the periphery of the column being cut.

These and other objects of this invention are accomplished by a collar encircling guide means or track which is adapted to support and guide an abrasive saw permitting pivotal movement of the saw with respect to the column, and maintaining the saw blade in a plane at a set angular relationship to the central axis of the column. The guide and support means provided herein permits pivotal movement of the saw whereby a kerf may be cut into the periphery of the column to a depth set by a depth gage means on the saw. In one embodiment the method of this invention contemplates severing any reinforcing elements present in the concrete and extending the kerf radially inwardly to a set distance whereby an uncut central support column remains as a support for the superjacent column segment. The portion of the column above the cut is then supported by well known means, such as a lifting cable attached to a crane or the like, and the remaining uncut central column fractured, such as by applying a side directed moment or applying a blow with a hammer. The unwanted column length is then removed, leaving a cut surface with a central rough broken area. The central area may be further dressed, if desired, such as by grinding, to provide a smooth surfaced cut end suitable for further construction.

DESCRIPTION OF THE PREFERRED EMBODIMENT

Figure 1:
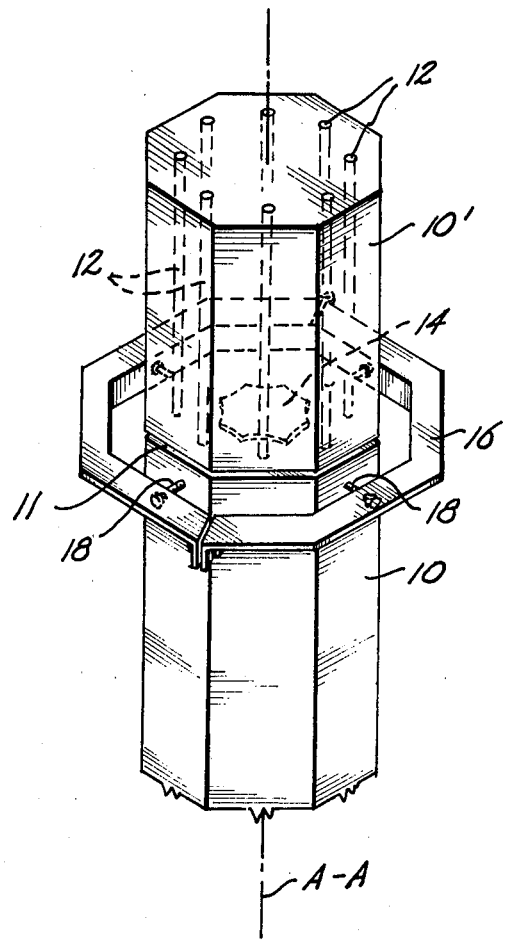
FIG. 1 is a perspective view of a column having a saw kerf adjacent a saw grinding track means, the kerf produced by the method and apparatus of this invention.

Referring specifically to the drawings wherein like figures indicate like parts, there is seen in FIG. 1 a perspective view of a column 10 in which a saw kerf 11 has been formed by the method and apparatus of this invention. The saw kerf 11 is shown having severed the reinforcing elements 12 and extends inwardly from the periphery of column 10 to the uncut center 14. The upper portion 10' of the column is shown in FIG. 1 still supported by the uncut center 14. The central axis A—A of column 10 extends substantially through the middle of column 10 and passes through the uncut center 14.

Figure 2:
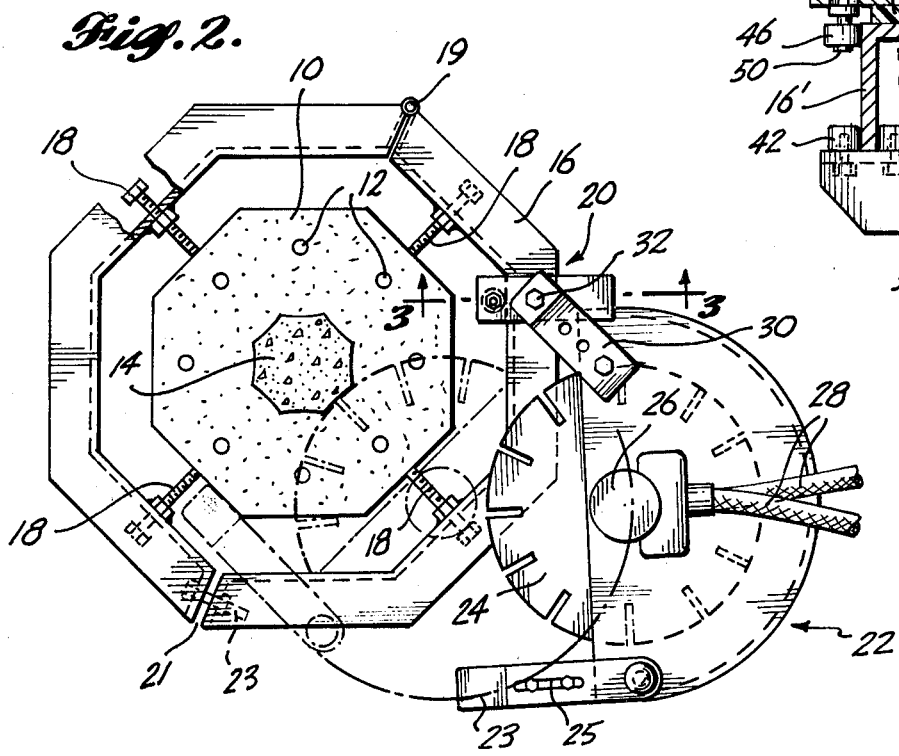
FIG. 2 is a plan view of the column shown in FIG. 1 at the saw kerf area, the upper portion of the column having been removed and showing the guide means and abrasive saw attached to said column.

FIGS. 1 and 2 both show a track means 16 positioned immediately below the area of the saw kerf 11. Track means 16 is substantially octagonal in configuration and contains a plurality of standoff bolts 18 engaging the periphery of the octagonal column 10. These standoff bolts 18 serve to position the track 16 a distance away from the surface of column 10 and provide the support for track 16 to column 10. Track means 16 is made up of a plurality of segments of angle iron welded together at the apices and hinged at hinge point 19, providing a pair of rigid track segments made up of four straight angle iron pieces. The segments are bolted together at apex 21 with fasteners 23. The fasteners 23 are drawn tightly together to securely engage standoff bolts 18 upon the surface of column 10 and fasten the track means 16 securely thereto. Track means 16 is shown positioned in a plane substantially perpendicular to axis A—A.

Figure 3:
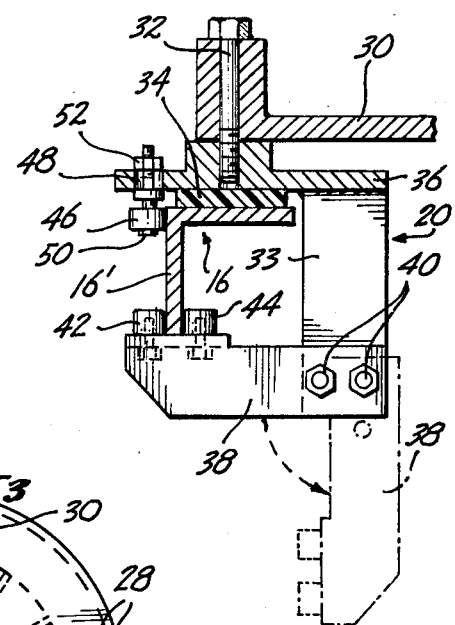
FIG. 3 is a cross-sectional view of the support mechanism taken along lines 3—3 of FIG. 2.

An abrasive saw, shown generally at 22 in FIG. 2, is pivotally attached to a carriage means 20 which is adapted to engage and ride upon track means 16. The carriage 20 shown in cross section in FIG. 3 comprises an upper support bracket 36 which carries a wear pad 34 engaging the upper surface of track 16. Wear pad 34 is, for example, a low friction polymer such as polytetrafluoroethylene, commonly sold under the trademark TEFLON, or equivalent polymer materials. Alternatively, a metal wear pad may be utilized. Also attached to the upper support bracket 36 is an upper guide roller 46 which is adjustably mounted in adjustment slot 48 of upper support bracket 36. Roller 46 may be adjusted to provide the proper angular orientation of the carriage 20 with respect to the track 16. Extending upwardly from the upper surface of upper support bracket 36 is saw pivot 32 which pivotally mounts saw arm 30. Web 33 extends downwardly from the upper bracket 36 and engages lower bracket 38 at fasteners 40. Fasteners 48 are readily removed to permit the entire saw support assembly to be dismounted from track 16 as shown by dotted lines in FIG. 3. The lower bracket 38 carries inner and outer guide rollers 42 and 44 respectively, which are adapted to travel along opposite sides of the lower web 16' of track means 16 as shown in FIG. 3. These guide rollers, capturing the web 16' of track means 16 as shown, prevent rotational movement of the carriage 20 about track means 16.

In FIG. 2 the saw 22 is shown carrying a depth guide 23 which may be adjusted in slot 25 to set the depth at which saw 24 may penetrate column 10. The depth gage 23 abuts a surface of column 10 and prevents further rotation radially inwardly of the saw 22.

In operation a column 10 to be cut is first marked for the location at which the cut is to take place to assure that it is at the proper elevation for the purpose intended. A track means 16 is then assembled adjacent the intended cut location and is positioned axially along the column 10 so that saw 24 when mounted upon the track 16 will cut a saw kerf at the intended location. The track 16 is opened about hinge point 19 and wrapped around the column 10 in the position as shown in FIGS. 1 and 2. The fasteners 23 are then securely tightened to provide a firm engagement of the standoff bolts 18 against the outer surface of column 10. The saw carriage 20 is then assembled about track 16 as shown in FIG. 3. The angular relationship between the track 16 and arm 30 may be adjusted, if necessary, by adjusting the relative position of upper guide roller 46. When carriage 20 is securely fastened upon track 16, the saw 22 is adjusted for proper depth of cut and started by applying hydraulic pressure through lines 28. When the saw blade 24 reaches its operating rotational speed, the saw 22 is pivoted toward column 10 until blade 24 engages and begins cutting the surface thereof. Saw 22 then is rotated inwardly until the desired portion of column 10 is cut along with reinforcing bars 12 to leave the central portion 14. The saw 22 is then rotated outwardly and moved along track 16 to another location where at the saw is again rotated into column 10 causing a second cut. A saw kerf is thus formed about the periphery of the column 10 leaving the uncut center 14. A cable is then attached to portion 10' of column 10 and upon application of a side-directed moment the uncut center 14 fractures and the portion 10' can be removed from the upper end of column 10. Alternatively, a wedge can be driven into the saw kerf 11 to provide a sufficient force to fracture uncut center 14. Depending upon the location and nature of the fracture it may then be desirable to dress the surface, as by abrasive grinding to remove any rough surface or excess concrete left in the area of center 14 so that a smooth end surface is provided on the column.

While the invention has been shown and described in relation to a specific preferred embodiment, it is to be understood that various modifications within the teachings herein are included within the scope of the appended claims.

I claim:

1. A tool for severing an elongated concrete member having a central axis comprising:
    a pivotally movable circular abrasive saw means;
    track means for supporting and guiding said abrasive saw means, said track means being hinged and separable at one point to allow said track means to be installed from the side of said member; said track means engaging and substantially encircling said member and having support surface means thereon; and
    track engaging saw support means movable along said track means to a plurality of peripheral positions, said saw support pivotally supporting said saw means and permitting said saw means to cut into said elongated concrete member by pivotal movement toward said central axis of said member, said saw support means having a low friction support pad means for slidably engaging said support surface of said track means, whereby said saw means is pivotally and slidably positioned upon said track means for sequentially cutting a circumferential kerf into the periphery of said elongated concrete member.

2. The apparatus of claim 1 wherein said track means includes a horizontally disposed support surface engaged by said support pad means and a vertical guide rail means engaged by said saw support means.

3. The apparatus of claim 2 wherein said horizontally disposed support surface lies in a plane substantially perpendicular to said central axis of said elongated concrete member and said saw means cuts a kerf substantially perpendicular to said central axis.

4. The apparatus of claim 1 wherein said elongated concrete member has a polygonal cross section, and said track means comprises a plurality of substantially straight segments adapted to be positioned adjacent and parallel to faces of said member.

5. The apparatus of claim 1 further including stop means engaging the side of said member to limit pivotal movement of said saw thereby controlling the depth of cut.

6. The apparatus of claim 1 wherein said track means is in two principal parts separable at one point having one hinge means holding said two parts relative to each other.

7. A method of severing an elongated concrete member comprising the steps of:
    encircling said member with a track means, said track means being separable at at least one point to allow said track means to be installed from the side of said elongated concrete member, said track means having saw supporting and guiding means thereon adapted to support, orient and hold an abrasive circular saw means so that said saw means can be positioned at a desired position along said track means and can be pivotally moved into sawing contact with said elongated concrete member;
    mounting said abrasive circular saw means on said saw supporting and guiding means;
    moving said saw means and said saw supporting and guiding means to a desired position along said track means;
    pivoting said saw means inwardly into sawing engagement with said member;

pivoting said saw means outwardly to disengage said saw from said member;

repositioning said saw means and said saw supporting and guiding means to another desired position along said track means and thereafter pivotally sawing said member; said repositioning and sawing continuing until a kerf about the periphery of said member has been cut leaving a central core of said member uncut; and breaking said central core to permit removal of a portion of said member.

8. The method of claim 7 wherein said member contains elongated metal reinforcing members positioned in said member and wherein said saw severs said metal reinforcing members.

9. The method of claim 7 wherein said elongated concrete member has a polygonal cross section and including the step of assembling said track means about said member with segments of said track means parallel to and spaced outwardly from surfaces of said member.

10. The method of claim 7 wherein said track means has at least one hinge and at least one separation point to allow said track means to be installed from the side of said elongated concrete member, said track means also having adjustable stand-off bolt means and fastening means at said separation point or points such that assembly of said track means about said member with said fastening means causes said stand-off means to engage said member thereby supporting said track means upon said member.

* * * * *